United States Patent
Coglitore et al.

(10) Patent No.: US 10,397,357 B2
(45) Date of Patent: Aug. 27, 2019

(54) RURAL AREA NETWORK DEVICE

(71) Applicant: Facebook, Inc., Menlo Park, CA (US)

(72) Inventors: Giovanni Coglitore, Saratoga, CA (US); Narsing Vijayrao, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 68 days.

(21) Appl. No.: 14/339,002

(22) Filed: Jul. 23, 2014

(65) Prior Publication Data

US 2016/0028830 A1 Jan. 28, 2016

(51) Int. Cl.
*H04L 29/08* (2006.01)

(52) U.S. Cl.
CPC ...... *H04L 67/2842* (2013.01); *H04L 67/2861* (2013.01)

(58) Field of Classification Search
CPC .............. H04L 67/141; H04L 67/1097; H04L 67/2842; H04L 67/2861; H04N 21/6587
USPC ......... 709/213, 217, 206; 711/133; 370/429; 455/426.1
See application file for complete search history.

(56) References Cited

U.S. PATENT DOCUMENTS

| | | | |
|---|---|---|---|
| 5,864,837 A | 1/1999 | Maimone | |
| 6,941,338 B1 * | 9/2005 | Madsen | G06F 17/30902 370/336 |
| 6,957,212 B2 | 10/2005 | Peng et al. | |
| 7,069,328 B1 * | 6/2006 | Bell | H04L 12/2801 370/395.3 |
| 7,099,927 B2 | 8/2006 | Cudd et al. | |
| 7,359,933 B1 | 4/2008 | Polen et al. | |
| 7,574,481 B2 | 8/2009 | Moore et al. | |
| 7,743,022 B2 | 6/2010 | Kaasten et al. | |
| 7,865,463 B2 | 1/2011 | Sollicito et al. | |
| 8,255,921 B2 | 8/2012 | Arvidsson et al. | |
| 8,279,780 B2 | 10/2012 | Yamamoto | |
| 8,316,098 B2 | 11/2012 | Luna et al. | |
| 8,601,090 B1 | 12/2013 | Cormie et al. | |
| 8,788,475 B2 | 7/2014 | Fredricksen et al. | |

(Continued)

FOREIGN PATENT DOCUMENTS

JP 2003008664 A 1/2003

OTHER PUBLICATIONS

Michael Peck, That Drone Is a Wi-Fi Hotspot, Apr. 8, 2014, warisboring.com, https://warisboring.com/that-drone-is-a-wi-fi-hotspot/ (Year: 2014).*

(Continued)

*Primary Examiner* — Zi Ye
(74) *Attorney, Agent, or Firm* — Van Pelt, Yi & James LLP

(57) ABSTRACT

Some embodiments of this disclosure operate a network device in conjunction with a social networking system. The operations can include establishing a network island by providing network connectivity in a local region via the network device; connecting the network device to an intermittent network channel that is not continuously active; when the intermittent network channel is active, receiving a content item via the intermittent network channel, wherein the content items is not destined for a specific device in the network island; and caching the content item in a cache storage of the network device such that the content item is available to be accessed by any computing device within the network island.

20 Claims, 7 Drawing Sheets

(56) References Cited

U.S. PATENT DOCUMENTS

| | | | |
|---|---|---|---|
| 8,812,651 B1 | 8/2014 | Rennie et al. | |
| 9,015,269 B2 | 4/2015 | Bellessort et al. | |
| 9,055,124 B1 | 6/2015 | Hill et al. | |
| 9,189,510 B2 | 11/2015 | Song et al. | |
| 9,229,740 B1 | 1/2016 | Allen et al. | |
| 2001/0030469 A1* | 10/2001 | Tsujikado | G06F 1/263 307/66 |
| 2002/0047861 A1* | 4/2002 | LaBrie | G06Q 30/02 715/733 |
| 2002/0087797 A1* | 7/2002 | Adrangi | G06F 12/0888 711/133 |
| 2002/0160773 A1 | 10/2002 | Gresham et al. | |
| 2002/0178330 A1* | 11/2002 | Schlowsky-Fischer | H04N 21/6587 711/133 |
| 2003/0063770 A1 | 4/2003 | Svendsen et al. | |
| 2003/0084091 A1 | 5/2003 | Agarwalla | |
| 2003/0101267 A1 | 5/2003 | Thompson et al. | |
| 2004/0128346 A1 | 7/2004 | Melamed et al. | |
| 2004/0167967 A1* | 8/2004 | Bastian | B64D 11/0015 709/206 |
| 2005/0102300 A1 | 5/2005 | Madsen | |
| 2005/0188304 A1 | 8/2005 | Lawton et al. | |
| 2005/0234864 A1 | 10/2005 | Shapiro | |
| 2006/0010225 A1 | 1/2006 | Issa et al. | |
| 2006/0167979 A1 | 7/2006 | Fuchs et al. | |
| 2007/0010245 A1* | 1/2007 | Levitan | G06Q 30/04 455/426.1 |
| 2008/0005195 A1 | 1/2008 | Li | |
| 2009/0100268 A1 | 4/2009 | Garcia et al. | |
| 2009/0125391 A1 | 5/2009 | Toutonghi et al. | |
| 2009/0132640 A1 | 5/2009 | Verma et al. | |
| 2009/0168795 A1* | 7/2009 | Segel | H04L 67/104 370/429 |
| 2010/0007713 A1 | 1/2010 | Yamamoto et al. | |
| 2010/0122217 A1 | 5/2010 | Yen et al. | |
| 2010/0229221 A1 | 9/2010 | Tam | |
| 2010/0333131 A1 | 12/2010 | Parker et al. | |
| 2011/0035503 A1 | 2/2011 | Zaid et al. | |
| 2011/0276535 A1 | 11/2011 | Pin et al. | |
| 2011/0314085 A1 | 12/2011 | Koronthaly et al. | |
| 2012/0158973 A1 | 6/2012 | Jacobson | |
| 2012/0166436 A1 | 6/2012 | Kalasapur | |
| 2012/0198075 A1 | 8/2012 | Crowe et al. | |
| 2012/0290436 A1* | 11/2012 | Frost | G06Q 30/06 705/26.41 |
| 2013/0007205 A1* | 1/2013 | Humphreys | G06F 17/30902 709/217 |
| 2013/0073609 A1 | 3/2013 | Connolly et al. | |
| 2013/0073622 A1 | 3/2013 | Nguyen et al. | |
| 2013/0080895 A1 | 3/2013 | Rossman et al. | |
| 2013/0097236 A1 | 4/2013 | Khorashadi et al. | |
| 2013/0138763 A1 | 5/2013 | Panzer et al. | |
| 2013/0219006 A1* | 8/2013 | Kuo | H04L 67/2814 709/213 |
| 2014/0040412 A1* | 2/2014 | Yanagihara | H04L 67/2842 709/213 |
| 2014/0064095 A1* | 3/2014 | Li | H04L 47/32 370/236 |
| 2014/0075307 A1 | 3/2014 | Bargas et al. | |
| 2014/0143647 A1 | 5/2014 | Reshadi et al. | |
| 2014/0173230 A1 | 6/2014 | Smith et al. | |
| 2014/0181040 A1 | 6/2014 | Montulli et al. | |
| 2014/0280515 A1 | 9/2014 | Wei et al. | |
| 2014/0344437 A1 | 11/2014 | Huang | |
| 2015/0004949 A1* | 1/2015 | Fienberg | H04M 3/42136 455/414.1 |
| 2015/0169701 A1 | 1/2015 | Stekkelpak et al. | |
| 2015/0201033 A1 | 7/2015 | Gupta | |
| 2016/0028830 A1 | 1/2016 | Coglitore | |
| 2016/0028846 A1 | 1/2016 | Coglitore et al. | |
| 2016/0191673 A1 | 6/2016 | Bohannon et al. | |

OTHER PUBLICATIONS

U.S. Appl. No. 14/584,815 by Bohannon, P. et al., filed Dec. 29, 2014.
U.S. Appl. No. 14/152,166 by Gupta, V., filed Jan. 10, 2014.
U.S. Appl. No. 14/338,994 by Coglitore et al., filed Jul. 23, 2014.
International Search Report and Written Opinion for International Application No. PCT/US2014/072633 dated Sep. 1, 2015; 13 pages.
Non-Final Office Action dated Feb. 12, 2016, in U.S. Appl. No. 14/152,166 of Gupta, V., et al., filed Jan. 10, 2014.
Advisory Action dated Oct. 5, 2016, in U.S. Appl. No. 14/152,166 of Gupta, V., et al., filed Jan. 10, 2014.
Non-Final Office Action dated Oct. 17, 2016, in U.S. Appl. No. 14/338,994 of Coglitore, G., et al., filed Jul. 23, 2014.
Extended European Search Report for Application No. 15189459.9, dated May 6, 2016, 9 pages.
Wathsala, W.V., et al.: "Next Generation Proxy Servers," Advanced Communication Technology, Feb. 17, 2008, pp. 2183-2187.
Final Office Action dated Jul. 22, 2016, in U.S. Appl. No. 14/152,166 of Gupta, V., et al., filed Jan. 10, 2014.
Final Office Action dated Mar. 23, 2017 of U.S. Appl. No. 14/338,994 by Coglitore, G., et al., filed Jul. 23, 2014.
Advisory Action dated Aug. 3, 2017 for U.S. Appl. No. 14/338,994 of Coglitore, G. et al., filed Jul. 23, 2014.
International Preliminary Report on Patentability for International Application No. PCT/US2014/072633 dated Jul. 13, 2017; 9 pages.
Non-Final Office Action dated Aug. 14, 2017, in U.S. Appl. No. 14/584,815 of Bohannon, P. et al, filed Dec. 29, 2014.
Non-Final Office Action dated May 9, 2017, in U.S. Appl. No. 14/152,166 of Gupta, V., et al., filed Jan. 10, 2014.
Non-Final Office Action dated Sep. 11, 2017 in U.S. Appl. No. 14/338,994 of Coglitore, G., et al. filed Jul. 23, 2014.
Corrected Notice of Allowability dated Dec. 11, 2017 for U.S. Appl. No. 14/152,166 of Gupta, V., et al., filed Jan. 10, 2014.
Notice of Allowance dated Nov. 15, 2017 U.S. Appl. No. 14/152,166 of Gupta, V., et al., filed Jan. 10, 2014.

* cited by examiner

RURAL AREA NETWORK DEVICE

CROSS-REFERENCES TO RELATED APPLICATIONS

This application is related to and incorporates by reference in its entirety commonly assigned U.S. Non-Provisional application Ser. No. 14/338,994, entitled "RESIDENTIAL CACHE APPLIANCE UTILIZING A SOCIAL NETWORK", filed on Jul. 23, 2014.

RELATED FIELD

At least one embodiment of this disclosure relates generally to networking and providing connectivity, and in particular to rural area networking.

BACKGROUND

Connecting rural areas to the Internet has traditionally been a difficult task. The infrastructure costs to lay down network cables is a large investment. For the same reason, most rural areas do not have an electric utility nor a power grid. As such, alternative wireless methods may suffer from lack of continuous power. Furthermore, wireless networks may suffer from intermittent network disruptions. For an application that implements a conventional client-server computing architecture, intermittent network disruptions could interfere with proper operations of the application because the application as a client may be unable to receive instructions from its corresponding server.

Figure 1:
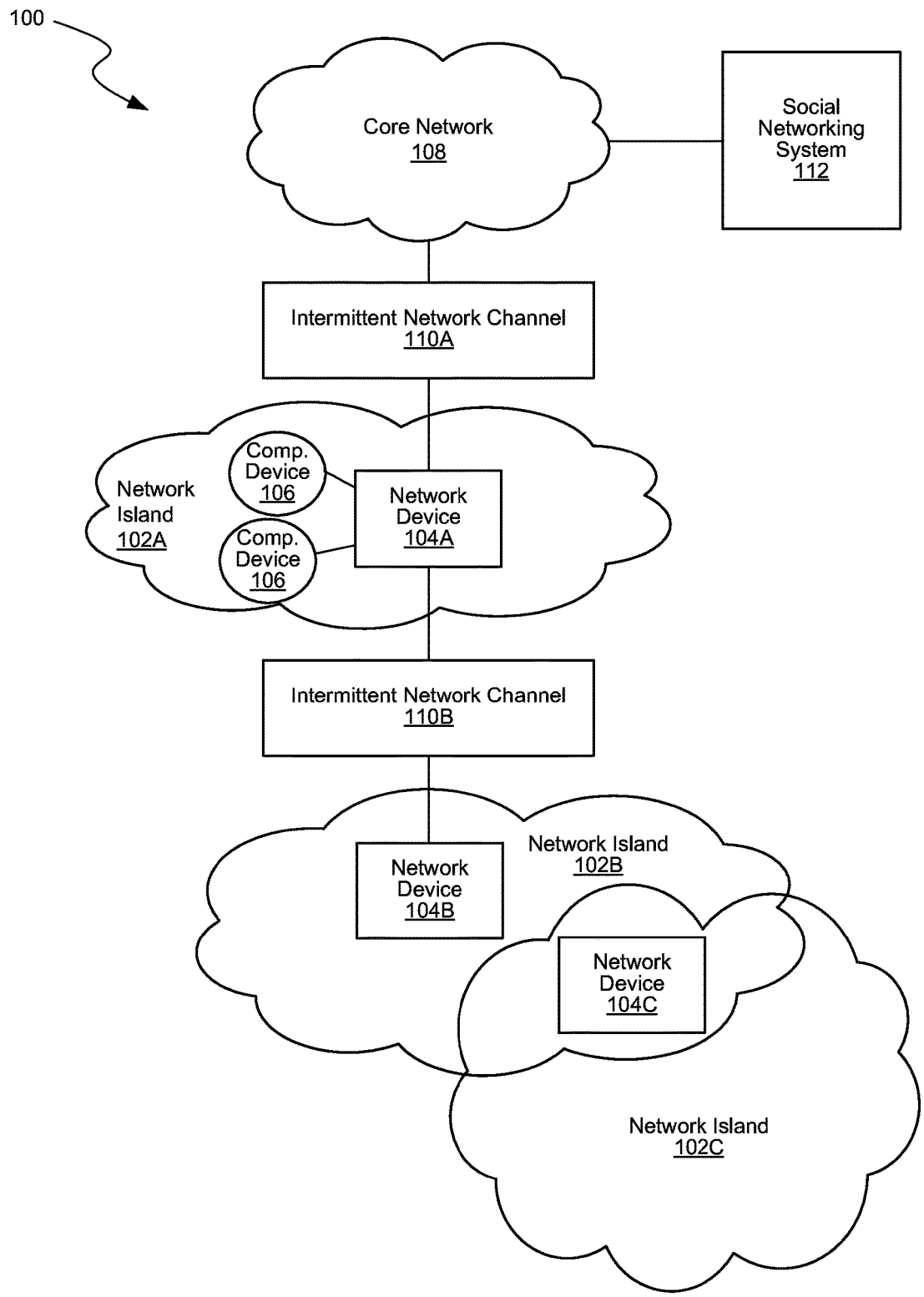
FIG. 1 is a block diagram illustrating a system architecture of a rural networking system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Disclosed are embodiments for configuring interconnected data communications network islands capable of providing continuous service despite intermittent network disruptions. The embodiments include a network device that provides wired and/or wireless network access to devices within each network island. The network device can have intermittent or continuous network access to at least another network island and/or a core network (e.g., the Internet). For example, the intermittent network connection may be established by connecting to an external network utilizing a satellite, an unmanned aerial vehicle, a train, or other intermittently connected communication relay. The network devices of the network islands can together form a "mesh" network. A mesh network is a network topology in which each mesh node (e.g., a network device) relays data for the network and all nodes cooperate in the distribution of data in the network.

A network device can provide basic social network functionalities to users within the network island, including newsfeed, messaging, media browsing, etc. The network device can buffer outgoing communications (e.g., content, messages, data requests, etc.) from one or more devices within the network island when the intermittent network access is inactive and can transmit them when the intermittent network access is active. The network device can also receive and cache incoming communications (e.g., webpages, incoming messages, media content, text, scripts, or executables), e.g., from computing devices external to a network island when the intermittent network access is active so that devices within the network island can access the resources when the intermittent network access is inactive. For example, the network device can cache recently requested resources, popularly requested resources, and resources matching preference profiles of users in the network island. A social networking system can generate and store profiles for users of the network device to predict what external resources to "push" to the network device for caching. Pushing involves a data transfer communication where a data transmission request is initiated by a server (e.g., the social network system) to a destination client (e.g., the network device).

The profile-specific resources can include data (e.g., personal data) associated with user profiles that are active within the network island. The profile-specific resources of the user profile can also include data associated with affiliated user profiles. For example, an affiliated social network node can be identified based on profile preferences, attributes, behaviors, or activities of the user profile. Another user profile may be affiliated with the user profile due to geographical proximity (e.g., within the same city or threshold distance radius), social proximity (e.g., socially connected to the user profile within a threshold degree of separation in a social graph of the social networking system), or network proximity (e.g., within the same network island).

The disclosed embodiments advantageously provide content access and social networking functionalities to rural areas utilizing a network device that receives predictive content pushes from a social networking system. Because the network device predictively caches data, e.g., whenever network access is active and available, the disclosed embodiments can avoid the problems that are usually caused by an intermittent network connection. Further, because the network device can be a standalone cache appliance, power consumption of the network device can be low enough to be powered by portable batteries, thus making the network island possible without power utility lines.

Social Networking System Overview

Various embodiments of the disclosed residential caching system utilize a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile"). Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

FIG. 1 is a block diagram illustrating a system architecture of a rural networking system 100, in accordance with various embodiments. The rural networking system 100 comprises a collection of network islands (e.g., a network island 102A, a network island 102B, a network island 102C, collectively as "network islands 102"). Each of the network islands 102 is established by a network device (e.g., a network device 104A of the network island 102A, a network device 104B of the network island 102B, and a network device 104C of the network island 102C). A network device can be a tower, a box, a router, an access point, or other electronic hardware for providing connectivity.

For example, the network device 104A can provide network connectivity for computing devices 106. The computing devices 106 can include computers, smart phones, tablets, or any other mobile or stationary devices. The network connectivity can be based on a wireless protocol, e.g., long-term evolution (LTE), 3G, 2G, Wi-Fi, Wi-Fi Direct, WiMAX, Bluetooth, Bluetooth LE, or any combination thereof. The network connectivity can also be based on a wired protocol, e.g., a universal serial bus (USB) or Ethernet.

In some embodiments, each of the network devices 104 can be connected directly or indirectly to a core network 108, e.g., the Internet or other regional network. For example, the network device 104A may be connected to the core network 108 via an intermittent network channel 110A. The intermittent network channel 110A is a transmission medium that provides connectivity between its endpoints non-continuously. That is, the intermittent network channel 110B may seize to function for a time either periodically or sporadically. For example, the intermittent network channel 110A may be implemented by a train, a drone, a satellite, or a ship.

In some embodiments, the network device 104A can provide continuous connectivity amongst the computing devices 106 in the network island 102A and non-continuous connectivity between the computing devices 106 and the core network 108. The network device 104A may also be connected to other network islands. For example, the network device 104A may be connected via an intermittent network channel 110B to the network device 104B and thus computing devices in the network island 102B. The intermittent network channel 110B is a transmission medium that provides connectivity between its endpoints non-continuously similarly to the intermittent network channel 110A.

The network island 102B, as established by the network device 104B, can include the network device 104C. For example, the network device 104C can be within a wireless range of the network device 104B. Because of this, the geographical area covered by the network island 102B and the network island 102C can overlap. As shown in this example, the core network 108, the network island 102A, the network island 102B, and the network island 102C forms a network chain (e.g., a mesh network). This enables the network island 102C, which does not have direct connection with the core network 108, to communicate with the global network community connected to the core network 108.

Because of the limitations imposed by the intermittent network channels 110A and 110B, the network islands 102 cannot always communicate with external systems coupled to the core network 108 in real-time. As such, the rural networking system 100 provides mechanisms to facilitate asynchronous networking capabilities via the network devices 104 and a social networking system 112. For outgoing data (e.g., messages, content, data requests, or any combination thereof) from one of more devices within one of the network islands 102, the network devices 104 can queue up the outgoing data until connectivity to the core network 108 becomes available (e.g., when the intermittent network channel 110A becomes available). Once the connectivity is available, the queued data is sent over via the intermittent network channel 110A. Likewise, the social networking system 112 can queue up incoming data to deliver to at least one of the network islands 102. Such incoming data may be previously requested by a user of the computing devices 106 within the network islands 102. Such incoming data may be destined for one of the computing devices 106 as determined by the social networking system 112 (e.g., based on a predictive caching mechanism).

The rural networking system 100 can optimize the efficiency of the asynchronous networking capabilities by enabling the social networking system 112 to predictably cache content in the network devices 104. For example, the social networking system 112 can maintain a list of the computing devices 106 in the network islands 102 and a list of social networking accounts associated with the computing devices 106. The social networking system 112 can track activities of the computing devices 106 and the social networking accounts. Based on the tracked activities, the social networking system 112 can generate a content affinity map for the network islands 102. Based on the content affinity map for the network island 102A, the social networking system 112 can then select content items from the core network 108 to cache in the network device 104A. This process can be similarly repeated for the network island 102B and the network island 102C.

Figure 2:
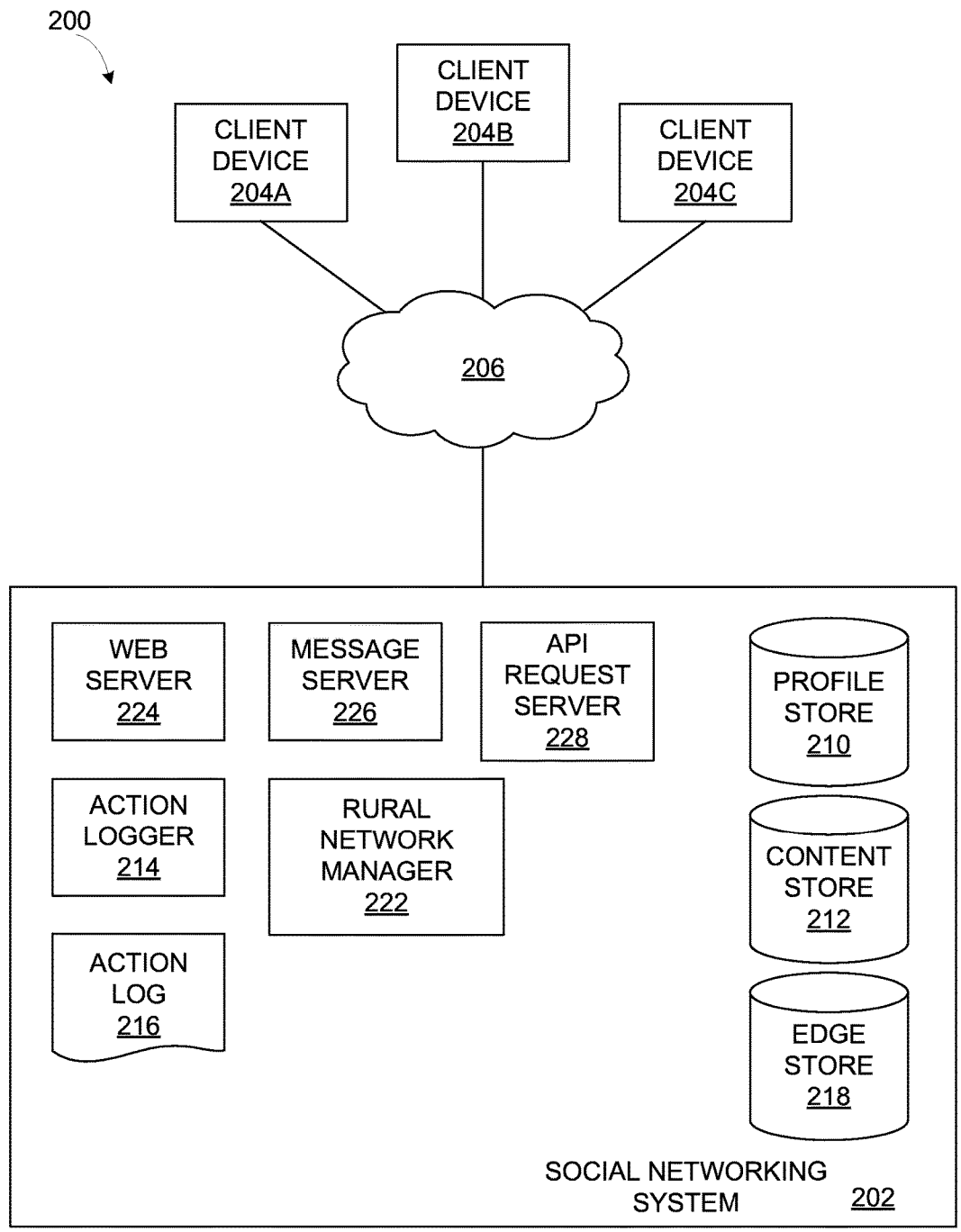
FIG. 2 is a high level block diagram of a system environment suitable for a social networking system, in accordance with various embodiments.

FIG. 2 is a high level block diagram of a system environment 200 suitable for a social networking system 202, in accordance with various embodiments. The system environment 200 shown in FIG. 2 includes the social networking system 202 (e.g., the social networking system 112 of FIG. 1), a client device 204A, and a network channel 206. The system environment 200 can include other client devices as well, e.g., a client device 204B and a client device 204C. The client device 204, for example, can be one of the computing devices 106 of FIG. 1 or one of the network devices 104 of FIG. 1. In other embodiments, the system environment 200 may include different and/or additional components than those shown by FIG. 2.

Social Networking System Environment and Architecture

The social networking system 202, further described below, comprises one or more computing devices storing user profiles associated with users and/or other objects as well as connections between users and other users and/or objects. Users join the social networking system 202 and then add connections to other users or objects of the social networking system to which they desire to be connected. Users of the social networking system 202 may be individuals or entities, e.g., businesses, organizations, universities, manufacturers, etc. The social networking system 202 enables its users to interact with each other as well as with other objects maintained by the social networking system 202. In some embodiments, the social networking system 202 facilitates users to interact with third-party websites (e.g., news websites, weather websites, content websites).

Based on stored data about users, objects and connections between users and/or objects, the social networking system 202 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 202 adds and/or modifies edges connecting the various nodes to reflect the interactions.

The client device 204A is a computing device capable of receiving user input as well as transmitting and/or receiving data via the network channel 206. In at least one embodiment, the client device 204A is a conventional computer system, e.g., a desktop or laptop computer. In another embodiment, the client device 204A may be a device having computer functionality, e.g., a personal digital assistant (PDA), mobile telephone, a tablet, a smart-phone or similar device. In yet another embodiment, the client device 204A can be a virtualized desktop running on a cloud computing service. The client device 204A is configured to communicate with the social networking system 202 via a network channel 206 (e.g., an intranet or the Internet). In at least one embodiment, the client device 204A executes an application enabling a user of the client device 204A to interact with the social networking system 202. For example, the client device 204A executes a browser application to enable interaction between the client device 204A and the social networking system 202 via the network channel 206. In another embodiment, the client device 204A interacts with the social networking system 202 through an application programming interface (API) that runs on the native operating system of the client device 204A, e.g., IOS® or ANDROID™.

The client device 204A is configured to communicate via the network channel 206, which may comprise any combination of local area and/or wide area networks, using both wired and wireless communication systems. In at least one embodiment, the network channel 206 uses standard communications technologies and/or protocols. Thus, the network channel 206 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 206 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 206 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 202 includes a profile store 210, a content store 212, an action logger 214, an action log 216, an edge store 218, a rural network manager 222, a web server 224, a message server 226, and an API request server 228. In other embodiments, the social networking system 202 may include additional, fewer, or different modules for various applications. Conventional components, e.g., network interfaces, security mechanisms, load balancers, failover servers, management and network operations consoles, and the like are not shown so as to not obscure the details of the system architecture.

User of the social networking system 202 can be associated with a user profile, which is stored in the profile store 210. A user profile is associated with a social networking account. A user profile includes declarative information about the user that was explicitly shared by the user, and may also include profile information inferred by the social networking system 202. In some embodiments, a user profile includes multiple data fields, each data field describing one or more attributes of the corresponding user of the social networking system 202. The user profile information stored in the profile store 210 describes the users of the social networking system 202, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 202 displayed in an image. A user profile in the profile store 210 may also maintain references to actions by the corresponding user performed on content items (e.g., items in the content store 212) and stored in the edge store 218 or the action log 216.

A user may specify one or more privacy settings, which are stored in the user profile, that limit information that the social networking system 202 is permitted to provide to external entities. For example, a privacy setting associated with a user profile can prevent the social networking system 202 from providing user activities or attribute information of the user profile to an external content provider or to another user.

The content store 212 stores content items (e.g., images, videos, or audio files) associated with a user profile. The content store 212 can also store references to content items that are stored in an external storage or external system. Content items from the content store 212 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 202. Examples of social networking content items include suggested connections or suggestions to perform other actions, media provided to, or maintained by, the social networking system 202 (e.g., pictures or videos), status messages or links posted by users to the social networking system, events, groups, pages (e.g., representing an organization or commercial entity), and any other content provided by, or accessible via, the social networking system.

The content store 212 also includes one or more pages associated with entities having user profiles in the profile store 210. An entity can be a non-individual user of the social networking system 202, e.g., a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 212, enabling social networking system users to more easily interact with the vendor via the social networking system 202. A vendor identifier is associated with a vendor's page, thereby enabling the social networking system 202 to identify the vendor and/or to retrieve additional information about the vendor from the profile store 210, the action log 216 or from any other suitable source using the vendor identifier. In some embodiments, the content store 212 may also store one or more targeting criteria associated with stored objects and identifying one or more characteristics of a user to which the object is eligible to be presented.

The action logger 214 receives communications about user actions on and/or off the social networking system 202, populating the action log 216 with information about user actions. Such actions may include, for example, adding a connection to another user, sending a message to another user, uploading an image, reading a message from another user, viewing content associated with another user, attending an event posted by another user, among others. In some embodiments, the action logger 214 receives, subject to one or more privacy settings, activity history and profile attributes associated with an external account of an external website and/or service. For example, the action logger 214 can retrieve an identifier from the activity history of the external account, and identifies an object, e.g., a content item or a page, in the social networking system associated with the identifier. This enables the action logger 214 to identify a user's preference toward a content item, or another object, in the content store 212. In addition, a number of actions described in connection with other objects are directed at particular users, so these actions are associated with those users as well. These actions are stored in the action log 216.

In accordance with various embodiments, the action logger 214 is capable of receiving communications from the web server 224 about user actions on and/or off the social networking system 202. The action logger 214 populates the action log 216 with information about user actions to track them. This information may be subject to privacy settings associated with the user. Any action that a particular user takes with respect to another user is associated with each user's profile, through information maintained in a database or other data repository, e.g., the action log 216. Such actions may include, for example, adding a connection to the other user, sending a message to the other user, reading a message from the other user, viewing content associated with the other user, attending an event posted by another user, being tagged in photos with another user, liking an entity, etc.

The action log 216 may be used by the social networking system 202 to track user actions on the social networking system 202, as well as external website that communicate information to the social networking system 202. Users may interact with various objects on the social networking system 202, including commenting on posts, sharing links, and checking-in to physical locations via a mobile device, accessing content items in a sequence or other interactions. Information describing these actions is stored in the action log 216. Additional examples of interactions with objects on the social networking system 202 included in the action log 216 include commenting on a photo album, communications between users, becoming a fan of a musician, adding an event to a calendar, joining a groups, becoming a fan of a brand page, creating an event, authorizing an application, using an application and engaging in a transaction. Additionally, the action log 216 records a user's interactions with advertisements on the social networking system 202 as well as applications operating on the social networking system 202. In some embodiments, data from the action log 216 is used to infer interests or preferences of the user, augmenting the interests included in the user profile and enabling a more complete understanding of user preferences.

Further, user actions that happened in particular context, e.g., when the user was shown or was seen accessing particular content on the social networking system 202, can be captured along with the particular context and logged. For example, a particular user could be shown/not-shown information regarding candidate users every time the particular user accessed the social networking system 202 for a fixed period of time. Any actions taken by the user during this period of time are logged along with the context information (i.e., candidate users were provided/not provided to the particular user) and are recorded in the action log 216. In addition, a number of actions described below in connection with other objects are directed at particular users, so these actions are associated with those users as well.

The action log 216 may also store user actions taken on external websites services associated with the user. For example, an external content distribution system may recognize a user of the social networking system 202 through social plug-ins that enable the external content distribution system to identify the user of the social networking system 202. Because users of the social networking system 202 are uniquely identifiable, the external content distribution system may use the information about these users to facilitate the users' interactions with the content distribution service. The action log 216 records data about these users, including viewing histories, advertisements that were engaged, purchases or rentals made, and other patterns from content requests and/or content interactions. Actions identified by the action logger 214 from the external content distribution system associated with the user enable the action log 216 to record further information about additional types of user actions.

In some embodiments, the edge store 218 stores the information describing connections between users and other objects on the social networking system 202 in edge objects. The edge store 218 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 202, e.g., expressing interest in a page or a content item on the social networking system, sharing a link with other users of the social networking system, and commenting on posts made by other users of the social networking system. The edge store 218 stores edge objects that include information about the edge, e.g., affinity scores for objects, interests, and other users. Affinity scores may be computed by the social networking system 202 over time to approximate a user's affinity for an object, a content item, interest, and other users in the social networking system 202 based on the actions performed by the user. The rural network manager 222, for example, can use these affinity scores to determine what content items to cache on a network device (e.g., one of the network devices 104 of FIG. 1) serving a network island. Multiple interactions of the same type between a user and a specific object may be stored in one edge object in the edge store 218, in at least one embodiment. In some embodiments, connections between users may be stored in the profile store 210. In some embodiments, the profile store 210 may reference or be referenced by the edge store 218 to determine connections between users. Users may select from predefined types of connections, or define their own connection types as needed.

The web server 224 links the social networking system 202 via a network to one or more client devices; the web server 224 serves web pages, as well as other web-related content, e.g., Java, Flash, XML, and so forth. The web server 224 may communicate with the message server 226 that provides the functionality of receiving and routing messages between the social networking system 202 and client devices. The messages processed by the message server 226 can be instant messages, email messages, text and SMS (short message service) messages, photos, or any other suitable messaging technique. In some embodiments, a message sent by a user to another user can be viewed by other users of the social networking system 202, for example, by the connections of the user receiving the message. An example of a type of message that can be viewed by other users of the social networking system besides the recipient of the message is a wall post. In some embodiments, a user can send a private message to another user that can only be retrieved by the other user.

The application program interface (API) request server 228 enables external systems to access information from the social networking system 202 by calling APIs. The information provided by the social network may include user profile information or the connection information of users as determined by their individual privacy settings. For example, a system interested in predicting the probability of users forming a connection within a social networking system may send an API request to the social networking system 202 via a network. The API request is received at the social networking system 202 by the API request server 228. The API request server 228 processes the request by determining the appropriate response, which is then communicated back to the requesting system via a network.

The rural network manager 222 is configured to implement functionalities for managing network devices (e.g., the network devices 104 of FIG. 1) of network islands (e.g., the network islands 102 of FIG. 1). These functionalities may be facilitated by the other modules described in the social networking system 202.

Figure 3:
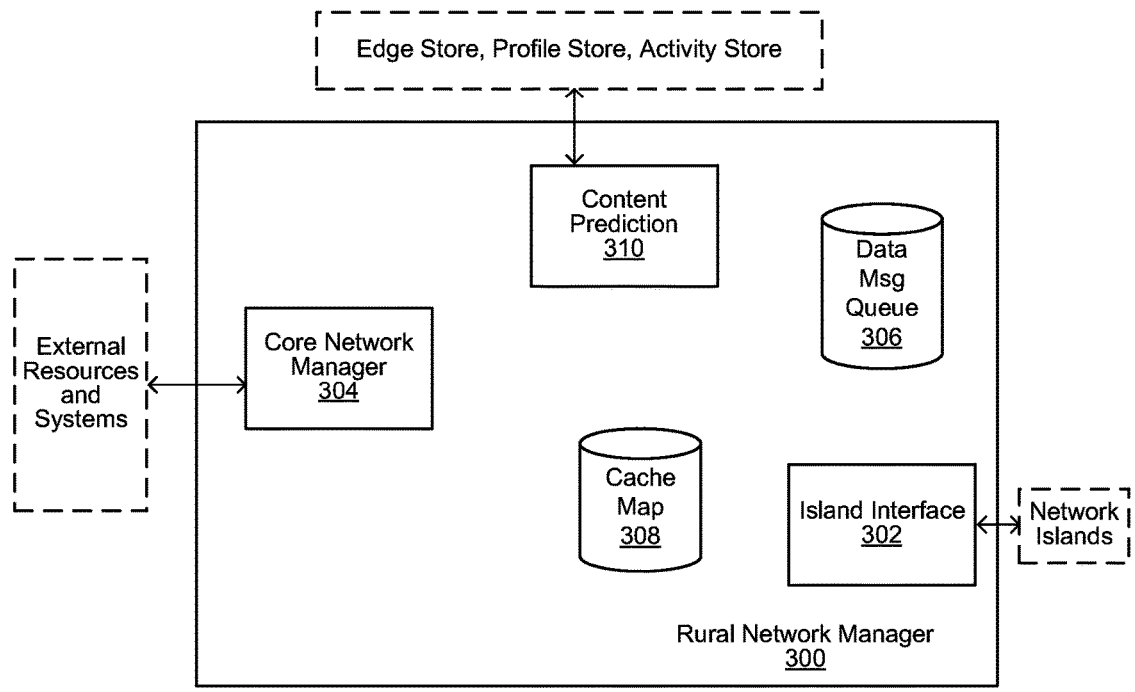
FIG. 3 is a block diagram illustrating an example of a rural network manager in a social networking system, in accordance with various embodiments.

FIG. 3 is a block diagram illustrating an example of a rural network manager 300 in a social networking system (e.g., the social networking system 202 of FIG. 2), in accordance with various embodiments. The rural network manager 300 can be a module within the social networking system implemented to manage one or more network islands in rural areas. The rural network manager 300 includes an island interface 302 for communicating with network devices, e.g., the network devices 104 of FIG. 1. For example, the island interface 302 can communicate through one or more intermittent network channels, e.g., the intermittent network channel 110A or the intermittent network channel 110B of FIG. 1.

The rural network manager 300 includes a core network interface 304. In some embodiments, the island interface 302 is part of or integral to the core network interface 304. The core network interface 304 facilitates communication with a core network, e.g., the Internet or the core network 108 of FIG. 1. When a data request is received via the island interface 302 for data available in the core network, the island interface 302 can forward the data request to the core network interface 304 to retrieve the requested data. Likewise, when a data request is received via the core network interface 304 for data available in the network islands, the core network interface 304 can forward the data request to the island interface 302 to retrieve the requested data. If one or more of the intermittent network channels connecting to the destination of the data request are unavailable, the island interface 302 can queue up the data request in a data message queue 306.

Any update to the social networking system received at the island interface 302 is propagated to the rest of the social networking system. This includes updating a user profile, sending messages between users, interaction records with content in the social networking system, and any other update to the social graph (e.g., as implemented by the edge store 218, profile store 210, action log 216, and/or content store 212 of FIG. 2.

Figure 5:
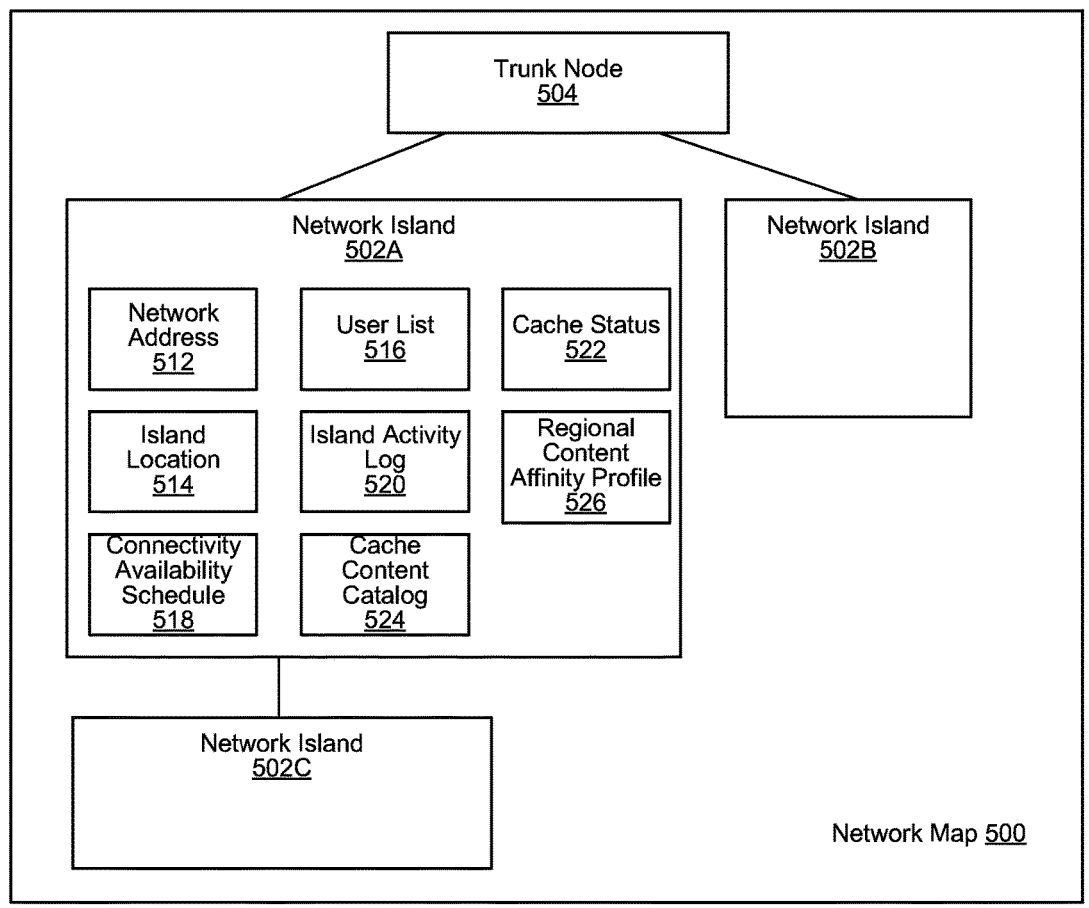
FIG. 5 is a block diagram illustrating an example of a cache map, in accordance with various embodiments.

The rural network manager 300 can maintain a cache map 308. FIG. 5 is a block diagram illustrating an example of the cache map 308, in accordance with various embodiments. The cache map 308 includes a network map 500 representing how network islands (e.g., a network island profile 502A, a network island profile 502B, and a network island profile 502C, collectively as the "network island profiles 502") are connected to each other and to a trunk node 504 that represents the island interface 302. The network island profiles 502 contain information to assist the rural network manager 300 to communicate with the network islands. For example, the network island profile 502A can include a network address 512, an island location 514, a user list 516, a connectivity availability schedule 518, an island activity log 520, a cache status 522, a cache content catalog 524, a regional content affinity profile 526, or any combination thereof. The other network island profiles have similar instances of these data constructs.

The network address 512 is an identifier that may be used by one or more network protocols (e.g., over the intermittent network channels) to connect the island interface 302 to the network island associated with the network island profile 502A. For example, when the network device of the network island profile 502A is first connected to the island interface 302, the network device can report its network address as the network address 512. The island location 514 is a representation of the geographical location of the network island. Similar to the network address 512, the island location 514 can be self-reported. For example, the network device can determine its position using a global positioning system (GPS), and transmit its geographical location to the island interface 302.

The user list 516 is a list of user identifiers (e.g., social networking accounts) known to the social networking system and that are associated with the network island profile 502A. For example, the island interface 302 can analyze an activity history of the network device to update the user list 516 to reflect users who have been recorded in the network activities monitored (e.g., via the network device) at the network island. The user list 516 can include a list of recent users (e.g., users recorded in recent network activities) according to a time threshold.

The connectivity availability schedule 518 is a schedule that indicates when the network device of the network island profile 502A is or at least can be connected (e.g., via the intermittent network channels) to the core network and/or the island interface 302. The connectivity availability schedule 518 may also include restrictions and characteristics of the network connectivity when it is available, e.g., bandwidth restrictions on the download and/or upload speed, cost of the network connectivity (if applicable), average network speed, and lag time. The connectivity availability schedule 518 can also identify which of the intermittent network channels provide the linkage from the island interface 302 to the network device of the network island profile 502A. The island interface 302 can determine the connectivity availability schedule 518 based on past network history, a self-reported schedule from the network device, one or more reported schedules from network equipment associated with the intermittent network channels, or any combination thereof.

The island activity log 520 stores network activities of the network island. The rural network manager 300 can either maintain the island activity log 520 by monitoring the island interface 302 and/or by receiving activity reports from the network device (e.g., the network device 400 of FIG. 4) associated with the network island profile 502A. The cache status 522 provides a real-time (e.g., when the intermittent network channels is continuously active to provide reports) or an asynchronous report of the status of a content cache (e.g., the content cache 416 of FIG. 4) on the network device associated with the network island profile 502A. For example, the cache status 522 can provide the available storage space left in the content cache. The cache status 522 can also provide the health status of the content cache (e.g., any errors or failures that have been detected).

The cache content catalog 524 stores a list of content identifiers corresponding to content items that are already stored in the content cache. The cache content catalog 524 is useful to prevent attempts to send a content item that is already present in the network island. Whenever the island interface 302 pushes a content item to the network device, the island interface 302 can include the content item in the cache content catalog 524. In some embodiments, the content item can be updated to the cache content catalog 524 after the island interface 302 receives a confirmation from the network device.

The regional content affinity profile 526 stores a list of content identifiers and content categories that a content prediction module 310 determines to be affiliated or likely to be affiliated with the users in the network island. The content prediction module 310 is configured to predict what content item or category should be pushed to the content cache associated with the network island profile 502A. The content prediction module 310 can ensure that a predicted content item is not currently stored in the content cache. In some embodiments, a list of content items and/or categories associated with the network island profile 502A and/or the user list 516 is stored as the regional content affinity profile 526. The content prediction module 310 can use the regional content affinity profile 526 to determine a schedule for pushing content items to a network device associated with the network island profile 502A.

Aside from building the regional content affinity profile 526, the content prediction module 310 can queue content items in the data message queue 306 to be pushed to a network device (e.g., the network device associated with the network island profile 502A). For example, the content prediction module 310 can select the content items based on the regional content affinity profile 526 and/or based on the various methods of predicting content items that the users in the user list 516 may prefer. In some embodiments, when the predicted content item is not available in the social networking system, the content prediction module 310 can retrieve the predicted content item from an external content storage in the core network and place the predicted content item in the data message queue 306 (to be sent to the network device once the intermittent network channel(s) become available/active).

The various methods of predicting content items can include, for example, basing the prediction on what content item or category has been recently requested by the network device. The content prediction module 310 can also base its prediction on social interactions between social networking accounts in the user list 516 and the content items or content categories in the content store 212 of FIG. 2. These social interactions can be retrieved from the edge store 218 or the action log 216 of FIG. 2 or from the island activity log 520. Such social interactions can include a social networking account "liking" or recommending a content item. The content prediction module 310 can select content items that have positive interactions (e.g., a recommendation, a share, or a "like") with the users in the user list 516 and remove content items that have negative interactions (e.g., a spam report, a "unshared" action, or a "hide content" action) with the users in the user list 516. The content prediction module 310 can select content items that are the most popular amongst the users in the user list 516.

The content prediction module 310 can select content items in a number of other methods. For example, the content prediction module 310 can select content items by matching content items to a predicted category. The content prediction module 310 can select content items by matching content items (or categories) to an explicit or inferred affinity profiles associated with the network island or specific users in the network island. The content prediction module 310 can use the user list 516 to identify the affinity profiles. The content prediction module 310 can select content items by matching content items (or categories) to a detected trend or pattern in user activities (e.g., as recorded in the island activity log 520) in the network island. The content prediction module 310 can select content items (or categories) by propagating predicted content items or categories chosen for a social network account to its related accounts (e.g., related by geographic proximity, network proximity, or social connection).

In some embodiments, the content prediction module 310 can select content items based on one or more machine learning models (e.g., Gaussian mixture model, support vector machines, or hidden Markov models). The content prediction module 310 can build a machine learning model using the profile attributes of the users on the user list 516, network activities recorded in the island activity log 520, attributes of the network island profile 502A, or any combination thereof as features. The previously requested content items and the features can serve as the training set for building the machine learning model. Once the machine learning model is generated, the content prediction module 310 can predict what a preferred content item or category associated with a user or a network island based on the current profile attributes of the user or users of the network island, the network activities history from the island activity log 520, the other attributes of the network island profile 502A, or any combination thereof.

The content prediction module 310 can further select a content item or category based on the island location 514. For example, the island location 514 is useful in selection the language of the content item or category. For another example, the island location 514 is useful in determining what news or weather (e.g., National Geography data) to retrieve from the core network for pushing to the network device. The cache content catalog 524 is used to make sure that a selected content item is not already stored in the designate network island.

The rural network manager 300 can update the cache map 308 whenever information becomes available. The information stored in the cache map 308 can then be used by the island interface 302, the content prediction module 310, or the core network interface 304. For example, the island interface 302 can reference the network addresses in the cache map 308 to determine which network channel to deliver its data messages. The island interface 302 can reference the social networking accounts in the user list 516 to determine where to send messages and requests designated for those accounts. The island interface 302 can schedule sending of messages, content, and requests (e.g., in the data message queue 306) based on the connectivity availability schedule 518. The island interface 302 can use the cache status 522 to determine whether to configure the network device to display an error message, to initiate error checking procedures remotely, or to replace certain cached content items. The island interface 302 can use the cache status 522 to determine whether to push any more content to the content cache. The island interface 302 can use the cache content catalog 524 to ensure that no content item is pushed to a constituent network device that already has the content item stored in its content cache.

The modules in the social networking system 202 can be implemented as hardware components, software components, or any combination thereof. For example, the modules described can be software components implemented as instructions on a non-transitory memory capable of being executed by a processor or a controller on a computer system described in FIG. 8. For another example, the methods and other techniques introduced in the modules can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, enabling data accessed or modified from one module to be accessed in another module. Each of the data storages can operate individually and independently of other data storages. Some or all of the data storages can be combined as one data storage. A single data storage can also be divided into sub-storages, each containing a portion of the single data storage.

The storages or "stores", described are hardware components or portions of hardware components for storing digital data. Each of the storage can be a single physical entity or distributed through multiple physical devices. Each of the storage can be on separate physical devices or share the same physical device or devices. Each of the stores can allocate specific storage spaces for run-time applications, processes, or modules.

The social networking system 202 can include additional, fewer, or different modules for various applications. Conventional components, e.g., network interfaces, security functions, load balancers, failover servers, management and network operations consoles, and the like are not shown so as to not obscure the details of the system.

Figure 4:
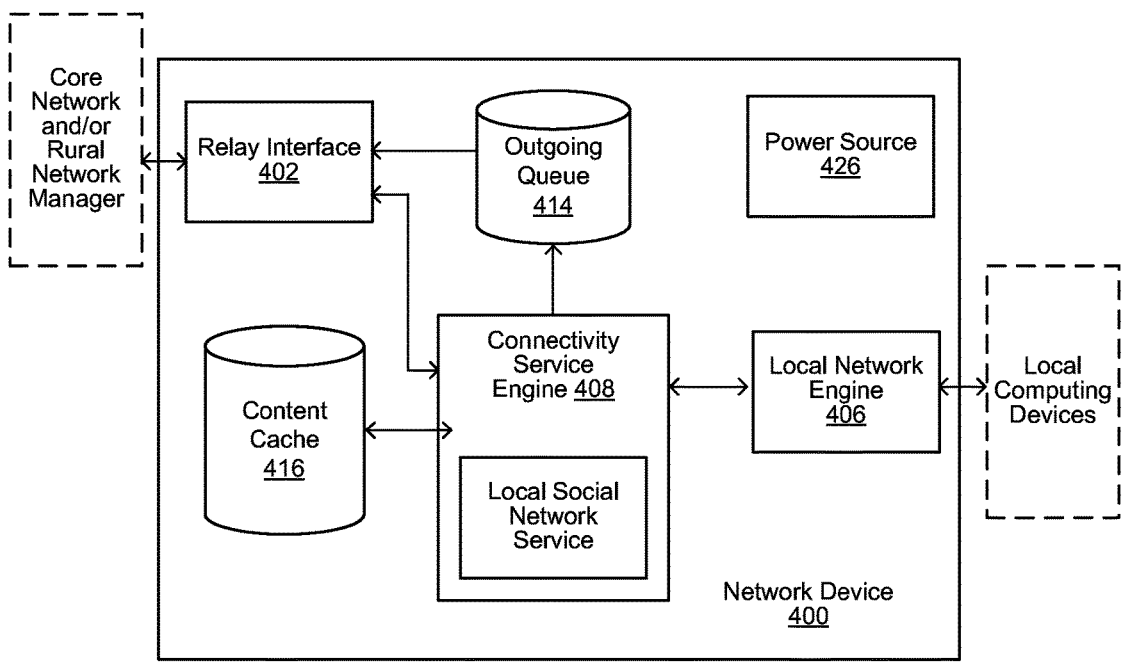
FIG. 4 is a block diagram illustrating an example of a network device for establishing a network island in a rural networking system, in accordance with various embodiments.

FIG. 4 is a block diagram illustrating an example of a network device 400 for establishing a network island in a rural networking system (e.g., the rural networking system 100 of FIG. 1), in accordance with various embodiments. The network device 400 can be one of the network devices 104 of FIG. 1. The network device 400 includes a relay interface 402, a local network engine 406, a connectivity service engine 408, an outgoing queue 414, a content cache 416, and a power source 426.

The relay interface 402 is a wireless communication component configured to communicate with a network channel. The network channel can be an intermittent network channel. For example, the intermittent network channel can be provided by a relay. The relay, for example, can be a drone, a plane, a satellite, a ship, a train, or other mobile vehicle for bringing wireless communication into range. In some embodiments, the relay can provide continuous network connection. In some embodiments, the relay is another network device similar to the network device 400. The relay interface 402 can be connected to a core network (e.g., the core network 108 of FIG. 1) via one or more relays.

The local network engine 406 is a network component configured to establish a network island and route network communication of devices in the network island via a network service. The local network engine 406, for example, can function as a router, a switch, a hub, or an access point. The local network engine 406 can establish a wireless network, a wired network, or a combination thereof. For example, the network island can be defined by the length of any wire or other interconnects coupled to the local network engine 406, the range of a wireless transceiver, or a combination thereof.

The connectivity service engine 408 is a server component that provides a limited content service to the devices in the network island established by the local network engine 406. For example, the limited content service includes access to content in an external network connected via the relay interface 402. The external network can be a global network (e.g., the Internet) or a regional network. In some embodiments, the limited content service includes providing a social networking service (e.g., as implemented by the social networking system 202 of FIG. 2).

The limited content service can be considered "limited" in the sense that the content service provides both asynchronous content and synchronous content from content distribution servers in the external network. A user (e.g., via a device in the network island) can request content via the connectivity service engine 408. When the relay interface 402 determines that the network channel (e.g., to a relay) is active (e.g., the network channel is continuously active or when an intermittent network channel actively connects the network device 400 to an external communication relay), the connectivity service engine 408 can respond to the content request by synchronously routing the content request to a content distribution server. While the network channel is active, the content distribution server can transmit or stream the content (e.g., through the connectivity service engine 408) to the requesting user. In some embodiments, when the network channel becomes inactive (e.g., when the intermittent network channel is not connected to the external communication relay) during a download, the connectivity service engine 408 can store a content request for resuming the download in the outgoing queue 414. Later when the network channel becomes active again, the relay interface 402 can send the content request from the outgoing queue 414.

When the relay interface 402 determines that the network channel is inactive, the connectivity service engine 408 can store any outgoing request, upload, or message in the outgoing queue 414. For example, the connectivity service engine 408 can implement the social network service. The social network service can enable social network accounts to communicate with each other. A message between social network accounts that are both associated with devices within the network island can receive such messages substantially instantaneously, where the local network engine 406 routes the message between the devices associated with the social network accounts. In some embodiments, in response to sending of the message when the network channel of the relay interface 402 is active, the connectivity service engine 408 uploads a record entry of the message to a social networking system (e.g., the social networking system 202) in the external network. Alternatively, when the network channel is inactive, the connectivity service engine 408 can schedule the record entry to be upload by placing the upload request in the outgoing queue 414.

In various embodiments, other types of messages can be routed between devices within the network island (e.g., data requests, machine messages, personal messages, or other data packets). The connectivity service engine 408 can route these messages in the same manner as the messages between social networking accounts.

In some embodiments, the connectivity service engine 408 can send a message from a social network account associated with a device within the network island to a social network account associated with a device in the external network. The message can be sent synchronously when the network channel is active, and asynchronously when the network channel is inactive. The message is sent asynchronously by scheduling the sending of the message in the outgoing queue 414 for when the network channel is active.

In various embodiments, other types of messages can be routed from a device within the network island (e.g., data requests, machine messages, personal messages, or other data packets) to a device in the external network. The connectivity service engine 408 can route these messages in the same manner as a message between a social networking account associated with a device within the network island and a social networking account associated with a device in the external network.

Incoming messages into the network island is received by the relay interface 402. The relay interface 402 can route the incoming messages to their proper destinations through the local network engine 406. As described in FIG. 3, when the network channel of the relay interface 402 is inactive, external systems (e.g., the social networking system 202) can queue up messages destined for the network island to be sent until the network channel is active.

In some embodiments, the relay interface 402 can receive content that is not destined specifically for a device in the network island. An external system can send the content under the assumption that there is a likelihood above a certain threshold that a device within the network island would subsequently request the content. The relay interface 402 can cache the content in the content cache 416. The connectivity service engine 408 can integrate the content available in the content cache 416 with the content services associated with external systems. For example, the connectivity service engine 408 can provide a social networking service associated with an external social networking system. The social networking service can operate functional services for interactions between devices in the network island in real-time and functional services between the network island and the external network asynchronously. When the network channel of the relay interface 402 is active, the social networking service can synchronously communicate with the external social networking system. When the network channel of the relay interface 402 is inactive, the social networking service can first determine whether the requested service can be fulfilled by accessing the content cache 416, before attempting to queue up a content request in the outgoing queue 414.

For example, the connectivity service engine 408 can provide a video content service. A user in the network island can request a particular video to watch. When the network channel of the relay interface 402 is active, an external video content provider can stream the video directly to the user. When the network channel is inactive, the video content service implemented by the connectivity service engine 408 can determine whether the requested video is in the content cache 416. If the requested video is in the content cache 416, the connectivity service engine 408 can respond to the video request directly to the user from the content cache 416. If the requested video is not in the content cache 416, the connectivity service engine 408 can queue up the video content request in the outgoing queue 414. In some embodiments, even when the network channel of the relay interface 402 is active, whenever a requested content item is determined to be present in the content cache 416, the requested content item can be provided from the content cache 416 to the requesting device. Various other content services can be provided by the connectivity service engine 408 that are compatible with this caching technique, including weather service, search service, encyclopedia service, map service, telephone service, audio content service, etc.

The power source 426 provides power to operate the network device 400. In embodiments, where the rural area served by the network device 400 has no stable power grid, the power source 426 can supplement an unstable power grid or independently power the network device 400 without any power grid. The power source 426, for example, can include a battery. In some embodiments, the battery can be rechargeable, e.g., rechargeable by a solar panel, a wind mill, a handle crank, a combustion engine, other type(s) of engine, other type(s) of renewable energy, or any combination thereof.

The modules in the network device 400 can be implemented as hardware components, software components, or any combination thereof. For example, the modules described can be software components implemented as instructions on a non-transitory memory capable of being executed by a processor or a controller on a computer system described in FIG. 8. For another example, the methods and other techniques introduced in the modules can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, enabling data accessed or modified from one module to be accessed in another module. Each of the data storages can operate individually and independently of other data storages. Some or all of the data storages can be combined as one data storage. A single data storage can also be divided into sub-storages, each containing a portion of the single data storage.

The storages or "stores", described are hardware components or portions of hardware components for storing digital data. Each of the storage can be a single physical entity or distributed through multiple physical devices. Each of the storage can be on separate physical devices or share the same physical device or devices. Each of the stores can allocate specific storage spaces for run-time applications, processes, or modules. The network device 400 can include additional, fewer, or different modules for various applications.

Figure 6:
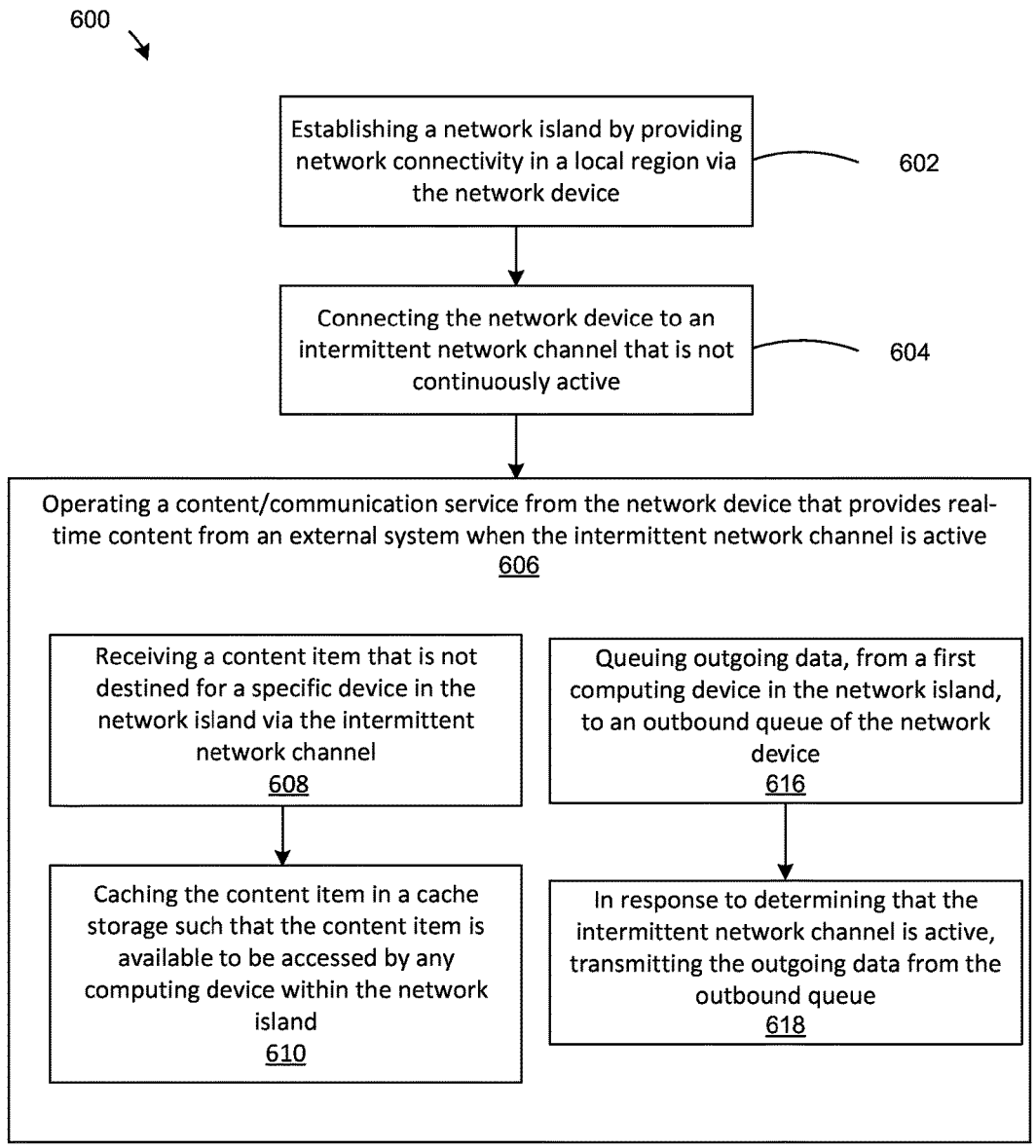
FIG. 6 is a flow chart illustrating a method of operating a network device to establish a network island in a rural networking system, in accordance with various embodiments.

FIG. 6 is a flow chart illustrating a method 600 of operating a network device (e.g., the network device 400 of FIG. 4) to establish a network island in a rural networking system (e.g., the rural networking system 100 of FIG. 1), in accordance with various embodiments. At block 602, the network device establishes a network island by providing network connectivity in a local region via the network device. At block 604, the network device connects the network device to an intermittent network channel that is not continuously active. For example, the network device can connect to the intermittent network channel by connecting via a relay vehicle (e.g., a satellite, a train, a drone, or a ship).

At block 606, the network device operates a content/communication service from the network device that provides real-time content from an external system (e.g., a content distribution system or a social networking system) when the intermittent network channel is active. The content/communication service can be a social network service implemented by the social networking system 202 of FIG. 2. The social network service can provide real-time service from an external social networking system when the intermittent network channel is active and asynchronous service when the intermittent network channel is inactive.

For example, when the intermittent network channel is active, the network device receives a content item that is not destined for a specific device in the network island via the intermittent network channel at sub-block 608. At sub-block 610, the network device caches the content item in a cache storage of the network device such that the content item is available to be accessed by any computing device within the network island. The network device can respond to a content request from a device within the network island by providing the content item in the cache storage to the device when the content request matches the content item. The network device can queue a content request from a device within the network island in an outbound queue when the content request does not match any content item in the cache storage and when the intermittent network channel is inactive. The network device can forward the content request to the external system when the content request does not match any content item in the cache storage and when the intermittent network channel is active.

At sub-block 616, the network device can queue outgoing data, from a first computing device in the network island, to an outbound queue of the network device. In response to determining that the intermittent network channel is active, the network device then transmits the outgoing data from the outbound queue to its destination over the intermittent network channel at sub-block 618.

Figure 7:
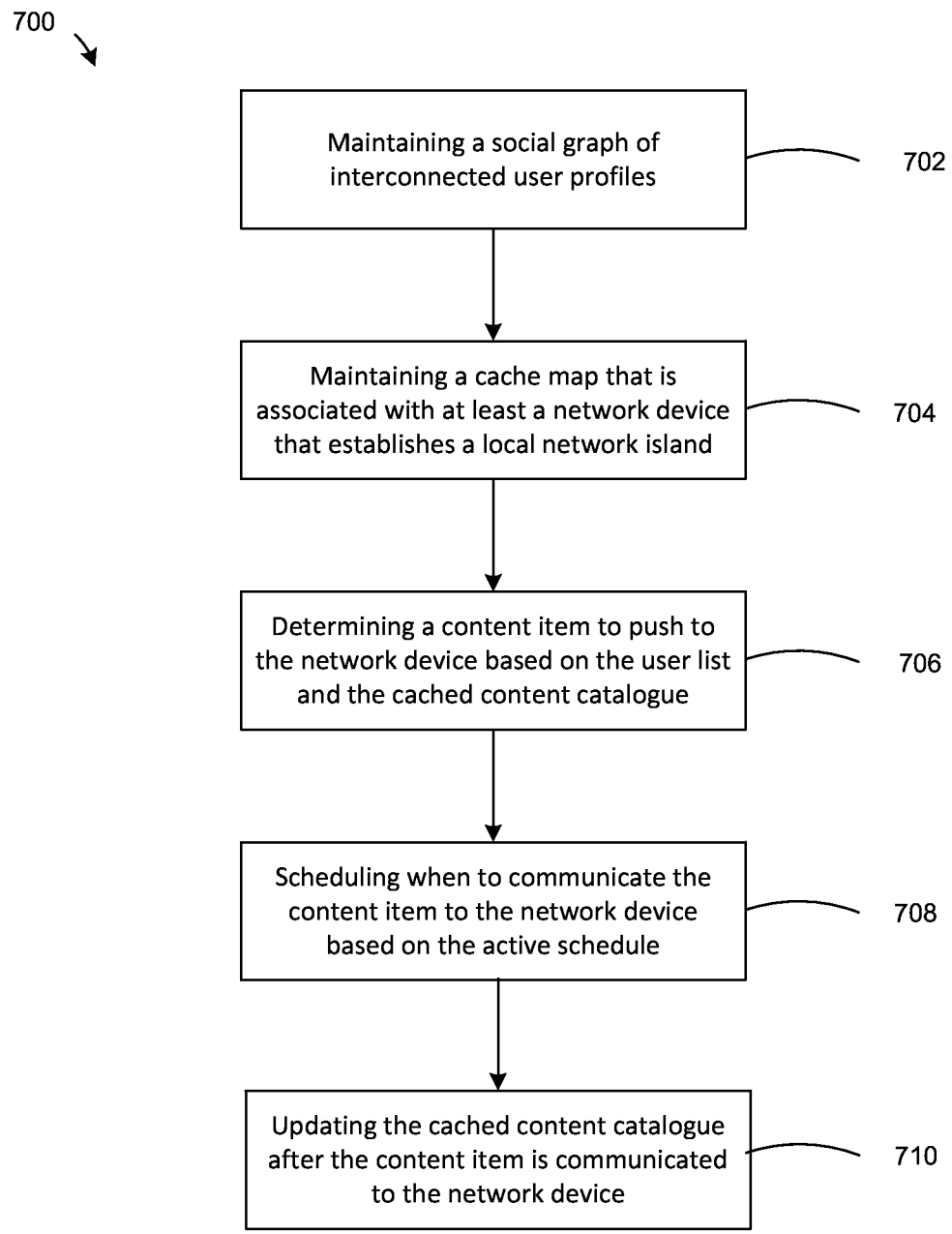
FIG. 7 is a flow chart illustrating a method of operating a predictive content distribution system to push content to a network device in a rural area, in accordance with various embodiments.

FIG. 7 is a flow chart illustrating a method 700 of operating a predictive content distribution system (e.g., the social networking system 202 of FIG. 2) to push content to a network device (e.g., the network device 400 of FIG. 4) in a rural area, in accordance with various embodiments. At block 702, the predictive content distribution system maintains a social graph of interconnected user profiles.

At block 704, the predictive content distribution system maintains a cache map that is associated with at least a network device that establishes a local network island. The cache map can include a user list that includes a subset of the interconnected user profiles that is active in the local network island, a cached content catalogue, an active schedule of the network device, or any combination thereof. The cache map can further include an device address of the network device for locating the network device via a network channel and/or an island geographical location of the local network island.

Maintaining the cache map can include monitoring user activity from the network device to update the user list. Maintaining the cache map can also include monitoring network activity from the network device to maintain an island activity log and compiling a regional content affinity profile based on the island activity log. Maintaining the cache map can further include monitoring a cache storage status of the network device. This is useful for the predictive content distribution system to respond to any problems at the network device. For example, the predictive content distribution system can generate a command to replace at least part of the cached content catalogue in the network device when the cache storage status indicates that a cache storage space of the network device is full.

At block 706, the predictive content distribution system determines (e.g., via a predictive content selection process) a content item to push to the network device based on the user list and the cached content catalogue. For example, determining the content item can include analyzing social connections of at least one user profile in the user list. In some embodiments, determining the content item can be based on the device address and/or based on the island geographical location. Compiling the regional content affinity profile can be based on the user list and user activity history associated with the user list. For example, the predictive content distribution system can select the content item based on another content item affiliated with a neighbor user of a first user in the user list. The neighbor user can be geographically, socially, or network-wise proximate to the first user.

At block 708, the predictive content distribution system schedules when to communicate the content item to the network device based on the active schedule. At block 710, the predictive content distribution system can update the cached content catalogue after the content item is communicated to the network device.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 8:
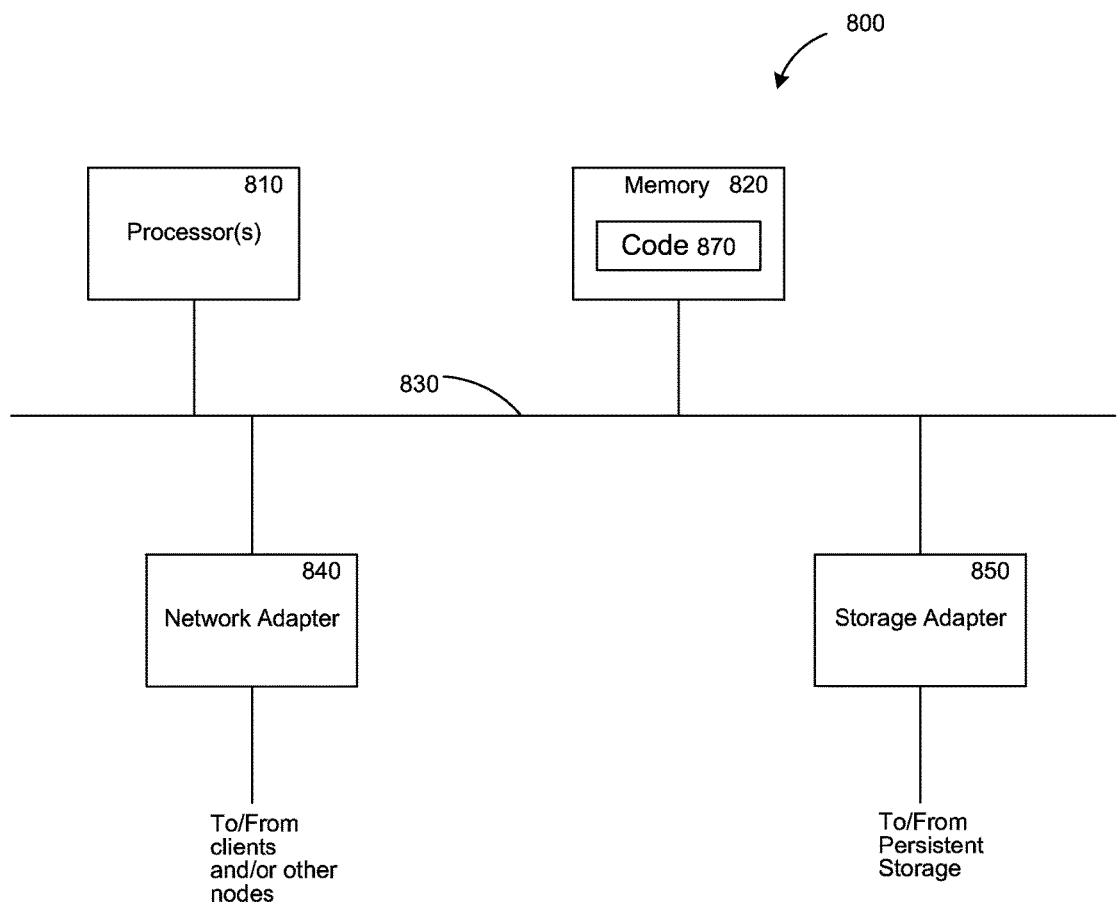
FIG. 8 is a diagrammatic representation of a machine in the example form of a computer system within which a set of instructions, for causing the machine to perform any one or more of the methodologies or modules discussed herein, may be executed.

FIG. 8 is a block diagram of an example of a computing device 800, which may represent one or more computing device or server described herein, in accordance with various embodiments. The computing device 800 can represent one of the computers implementing the social networking system 112 of FIG. 1, one of the computing devices 106 of FIG. 1, or one of the network devices 104 of FIG. 1. The computing device 800 includes one or more processors 810 and memory 820 coupled to an interconnect 830. The interconnect 830 shown in FIG. 8 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computing device 800 and thus controls the overall operation of the computing device 800. In certain embodiments, the processor(s) 810 accomplishes this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computing device 800. The memory 820 represents any form of random access memory (RAM), read-only memory (ROM), flash memory, or the like, or a combination of such devices. In use, the memory 820 may contain a code 870 containing instructions according to the mesh connection system disclosed herein.

Also connected to the processor(s) 810 through the interconnect 830 are a network adapter 840 and a storage adapter 850. The network adapter 840 provides the computing device 800 with the ability to communicate with remote devices, over a network and may be, for example, an Ethernet adapter or Fibre Channel adapter. The network adapter 840 may also provide the computing device 800 with the ability to communicate with other computers. The storage adapter 850 enables the computing device 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computing device 800 by downloading it from a remote system through the computing device 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification.

What is claimed is:

1. A method of operating a network device, comprising:
   establishing a network island by providing network connectivity to multiple computing devices in a local region via the network device;
   connecting the network device to an intermittent network channel that is not continuously active, wherein the network device facilitates asynchronous communication between a computing device of the multiple computing devices within the network island and an external computer system outside of the network island when the intermittent network channel is inactive, wherein the network device enables a specified computing device of the multiple computing devices to communicate with any of the multiple computing devices within the network island;

receiving, at the network device, a message from the specified computing device for one of the multiple computing devices within the network island;

sending, by the network device, the message to the one of the multiple computing devices, wherein the sending includes uploading, by the network device that is separate from the specified computing device that provided the message and separate from the recipient one of the multiple computing devices and remote from the external computer system, a record entry of the message to the external computer system when the intermittent network channel is active, or when the intermittent network channel is inactive, scheduling the record entry of the message to be uploaded to the external computer system at a later time based on a connectivity availability schedule and associated network characteristics of the intermittent network channel stored in a network island profile;

when the intermittent network channel is active according to the connectivity availability schedule, receiving a content item via the intermittent network channel, wherein the content item has been selected as an item to be predictively cached based on one or more social interactions of one or more social networking accounts identified to be subject to an intermittent network connectivity of the network island; and caching the content item in a cache storage of the network device such that the content item is available to be accessed by a computing device within the network island.

2. The method of claim 1, wherein, when the intermittent network channel is inactive, the asynchronous communication is performed by:

queuing outgoing data, from a first computing device in the network island, to an outbound queue of the network device; and in response to determining that the intermittent network channel is active, transmitting the outgoing data in the outbound queue.

3. The method of claim 1, wherein connecting the network device to the intermittent network channel includes establishing a communication with a mobile relay vehicle that is remote from the network device and the mobile relay vehicle increases a wireless range of a wireless communication system providing access to the external computer server that is to be provided the record entry of the message, and the mobile relay vehicle is a drone, a plane, a train or a ship.

4. The method of claim 1, wherein receiving the content item includes receiving the content item that is not associated with a specific destination device in the network island; and further comprising operating a content service from the network device that provides real-time content from an external content distribution system when the intermittent network channel is active.

5. The method of claim 4, wherein operating the content service includes responding to a content request from a device within the network island by providing the content item in the cache storage to the device when the content request matches the content item.

6. The method of claim 4, wherein operating the content service includes queuing a content request from a device within the network island in an outbound queue when the content request does not match any content item in the cache storage and when the intermittent network channel is inactive.

7. The method of claim 1, further comprising operating a social network service from the network device that provides real-time service from an external social networking system when the intermittent network channel is active and asynchronous service when the intermittent network channel is inactive.

8. A computer-readable storage memory storing computer-executable instructions for operating a predictive content distribution system, comprising:

instructions for maintaining, by a computer server system, a cache map that is associated with at least a network device that establishes a local network island by providing network connectivity to multiple computing devices, wherein the network device enables the multiple computing devices to communicate with one another within the local network island, the cache map including a user list that includes a subset of interconnected user profiles of a social graph that is active in the local network island, a cached content catalogue, and an active schedule of the network device, wherein the active schedule determines when the network device and thereby the local network island is active, wherein the network device facilitates asynchronous communication between a computing device of the multiple computing devices and an external computer system outside of the network island when an intermittent network channel between the network device and the computer server system is inactive, wherein the network device is configured to:

receive a message from a specified computing device of the multiple computing devices for one of the multiple computing devices within the network island, and send the message to the one of the multiple computing devices, wherein the sending includes uploading, by the network device that is separate from the specified computing device that provided the message and separate from the recipient one of the multiple computing devices and remote from the external computer system, a record entry of the message to the external computer system when the intermittent network channel is active, or when the intermittent network channel is inactive, scheduling the record entry of the message to be uploaded to the external computer system at a later time based on the active schedule specifying a connectivity availability schedule and associated network characteristics of the intermittent network channel stored in a network island profile;

instructions for selecting, by the computer server system, a content item to push to the network device based on the user list and the cached content catalogue when the intermittent network channel is active according to the connectivity availability schedule, wherein the content item has been selected as an item to be predictively cached based on one or more social interactions of one or more social networking accounts identified to be subject to an intermittent network connectivity of the network island; and instructions for scheduling, by the computer server system, a future time to communicate the content item to the network device based on the active schedule.

9. The computer-readable storage memory of claim 8, wherein determining the content item includes analyzing social connections of a user profile in the user list.

10. The computer-readable storage memory of claim 8, wherein maintaining the cache map includes monitoring user activity from the network device to update the user list.

11. The computer-readable storage memory of claim 8, further comprising instructions for updating the cached content catalogue after the content item is communicated to the network device.

12. The computer-readable storage memory of claim 8, wherein the cache map includes a device address of the network device for locating the network device via a network channel, and wherein determining the content item is based on the device address.

13. The computer-readable storage memory of claim 8, wherein the cache map includes an island geographical location of the local network island, and wherein determining the content item is based on the island geographical location.

14. The computer-readable storage memory of claim 8, wherein maintaining the cache map includes monitoring network activity from the network device to maintain an island activity log and compiling a regional content affinity profile based on the island activity log.

15. The computer-readable storage memory of claim 14, wherein compiling the regional content affinity profile is based on the user list and user activity history associated with the user list.

16. The computer-readable storage memory of claim 15, wherein compiling the regional content affinity profile includes selecting the content item based on another content item affiliated with a neighbor user of a first user in the user list, wherein the neighbor user is geographically, socially, or network-wise proximate to the first user.

17. The computer-readable storage memory of claim 15, wherein maintaining the cache map includes monitoring a cache storage status of the network device; and further comprising generating a command to replace at least part of the cached content catalogue in the network device when the cache storage status indicates that a cache storage space of the network device is full.

18. A network device, comprising:
a local network hardware component configured to establish a network island by providing network access to multiple network-enabled devices within a geographical region;
a hardware relay interface configured to communicate, via an intermittent network channel, with a global core network;
a processor configured to provide at least a content or communication service for the network-enabled devices in the network island, wherein the content or communication service is associated with an external service system in the global core network, wherein the processor is configured to provide the content or communication service both synchronously and asynchronously with the external service system, wherein the processor is configured to provide the content asynchronously when the intermittent network channel is inactive, wherein the processor enables the multiple network-enabled devices to communicate with one another within the local network island, and wherein the processor is configured to:

receive a message from a specified network-enabled device of the multiple network-enabled devices for one of the multiple network-enabled devices within the network island;

send the message to the one of the multiple network-enabled devices, wherein the sending includes uploading, by the network device that is separate from the specified computing device that provided the message and separate from the recipient one of the multiple computing devices and remote from the external computer system, a record entry of the message to the external service system when the intermittent network channel is active, or when the intermittent network channel is inactive, scheduling the record entry of the message to be uploaded to the external service system at a later time based on a connectivity availability schedule and associated network characteristics of the intermittent network channel stored in a network island profile; and a memory storage configured to provide content cache to store a content item received from the external service system when the intermittent network channel is active according to the connectivity availability schedule and to provide the content item when one of the network-enabled devices requests for the content item, wherein the content item has been selected as an item to be predictively cached based on one or more social interactions of one or more social networking accounts identified to be subject to an intermittent network connectivity of the network island.

19. The network device of claim 18, wherein the processor is further configured to queue in an outgoing queue a message destined to a device in the global core network when the intermittent network channel is inactive.

20. The network device of claim 18, further comprising a power source that provides power to the network device such that the network device can operate independent of a power grid.

* * * * *